Patented Apr. 29, 1947

2,419,618

UNITED STATES PATENT OFFICE 2,419,618

MANUFACTURE OF SULFAMIC ACID

Howard R. Wilson, Lakewood, Ohio, assignor to E. I. du Pont de Nemours & Company, Wilmington, Del., a corporation of Delaware No Drawing. Application November 6, 1943, Serial No. 509,281

1 Claim. (Cl. 23—166)

This invention relates to the manufacture of sulfamic acid and is particularly directed to processes in which urea, sulfuric acid and sulfur trioxide are brought together in proportions to give substantially one mole of sulfuric acid and at least one mole of sulfur trioxide for each mole of urea while effecting cooling sufficient to inhibit formation of sulfamic acid whereby a wet product is obtained and thereafter heating the wet product to transform it into dry sulfamic acid.

It has been heretofore known that sulfamic acid can be produced from urea, sulfur trioxide and sulfuric acid. See U. S. Patent 2,102,350, German Patent 636,329, German Patent 641,238 and U. S. Patent 2,191,754. It is known that the reactions involved are strongly exothermic and that precautions must be taken to insure adequate dissipation of the heat of the reaction which otherwise might proceed with undue violence. According to German Patent 641,238 it is proposed to add urea to oleum slowly and with cooling and thereafter to heat the reaction mixture to cause the sulfamic acid to precipitate. To effect this result an excess of sulfuric acid is utilized. Thus whereas the theoretical proportions are one mole of urea to one mole of sulfuric acid to one mole of sulfur trioxide, Example 1 of German Patent 641,238 utilizes sulfuric acid in the proportion of five times the theoretical and sulfur trioxide in the proportion of three times the theoretical. Thus the sulfuric acid is substantially in excess of both the theoretical amounts of urea and sulfur trioxide and as a result the reaction is carried out throughout in a liquid phase and the resulting sulfamic acid is precipitated in this liquid medium.

Because of the difficulties encountered in separating crystals of sulfamic acid from strong sulfuric acid solutions it is desirable so to proportion the constituents that the final product is obtained as a dry product. Thus if the theoretical proportions are utilized, theoretically at least there should be obtained sulfamic acid as such. In practice, however, it is found that this is not necessarily the case because there are other reactions, which take place especially if the temperature is allowed to become too high, which result in other products such as ammonium bisulfate. Also, because of the difficulty of dissipating the heat of the reaction it is difficult if not impossible by ordinary methods to obtain any product at all if the combining proportions of the reagents are utilized.

I have now found that sulfamic acid can be produced directly as a dry product by bringing together urea, oleum and sulfur trioxide in proportions to give substantially one mole of sulfuric acid and at least one mole sulfur trioxide for each mole of urea while effecting cooling sufficient to inhibit formation of sulfamic acid whereby a wet product is obtained and thereafter heating the wet product to transform it into dry sulfamic acid.

By the processes of my invention I am able to avoid the disadvantages of the prior art and to obtain directly as the product of the process dry sulfamic acid.

When urea, sulfuric acid and sulfur trioxide are brought together it is possible for several reactions to take place. Thus the sulfur trioxide may react with the urea to form carbamido monosulfonic acid or the sulfuric acid may react with the urea to form urea bisulfate. These intermediate products may then react with the remaining component to give sulfamic acid. These several reactions do not proceed with the same velocity or at the same temperatures and by taking proper precautions in bringing the three reagents together the sulfamic acid-forming reactions may be so suppressed that a wet product is obtained which subsequently may be converted to dry sulfamic acid simply by heating. It appears that the intermediate reactions are exothermic so that dissipation of the heat of the reaction in processes of the invention is divided between two stages. Consequently the reaction is more controllable and the wet product may be converted to dry sulfamic acid without the explosion hazards accompanying indiscriminate combining of urea, oleum and sulfur trioxide in the combining proportions.

In carrying out my invention I bring urea, sulfuric acid and sulfur trioxide together in the proportions to give substantially one mole of sulfuric acid and at least one mole of sulfur trioxide for each mole of urea under conditions such that the sulfamic acid-forming reaction is suppressed and a wet product is obtained and thereafter heat the wet product to convert it to dry sulfamic acid. When the temperature of the wet product is raised sufficiently the sulfamic acid-forming reaction is no longer suppressed and proceeds at a varying rate according to the temperature. If the temperature is sufficient the heat of the reaction may be sufficient to cause the reaction to proceed spontaneously and in such case it may be desirable to effect cooling in order to prevent the temperature from becoming excessive.

The most important factor in suppressing the sulfamic acid-forming reaction is temperature. The sulfamic acid-forming reaction does not appear to proceed spontaneously at temperatures below about 110° F., but this temperature may vary according to other conditions such as the formation of intermediate products involving urea and sulfur trioxide, or sulfuric acid or sulfamic acid. The latter has been found particularly effective in suppressing the sulfamic acid-forming reaction. It is important that adequate cooling be provided to maintain the temperature throughout the reaction mass below that critical temperature at which the sulfamic acid-forming reaction proceeds spontaneously. Local temperature rises above this critical temperature should be avoided as they provide nuclei for a self-propagation reaction which would spread throughout the entire mass once it was started.

The invention may be more fully understood by reference to the following example in which the parts are by weight unless otherwise specified.

*Example 1*

30 grams of urea was heated with 100 grams of sulfamic acid crude on a steam plate. A viscous paste was formed. 24 parts of sulfuric acid (100%) was then added and the paste became slightly thicker. It set to a damp crumbly solid on cooling below 40° C. With the above mix in a steel pot in an ice bath there was added 65 grams of 65% oleum at an average rate of about 6.5 grams per minute. The temperature of the mix during the addition of oleum was maintained between 60 and 70° C. The mix was quite fluid. The pre-mix was then converted to sulfamic acid by pouring it on a cold steam plate and heating to a temperature of 100-120° C.

It is to be noted that the reagents in the example were in the proportions of one mole of sulfuric acid and one mole of sulfur trioxide for each mole of urea and during the pre-mix the formation of sulfamic acid was so inhibited that the pre-mix remained in the wet fluid state yet was so constituted that on simply heating it would transform to sulfamic acid.

*Example 2*

Urea was added at an average rate of 1.2 grams per minute to 195 parts of 56% oleum until 60 parts of urea was added. Throughout the addition of urea a temperature of 95-100° F. was maintained. Gas was evolved throughout the addition of urea and the volume increased considerably but no difficulty was encountered in maintaining the temperature below 100° F. The final mixture was heavy and creamy in appearance.

One portion of the final mixture was allowed to stand overnight to determine its stability at atmospheric temperatures. Apparently nothing happened during this period. The remaining portion was heated slowly at 100° F. A slow reaction was observed but it was necessary to continue the application of heat until 150° F. was reached at which point the reaction maintains itself gradually increasing in intensity until with a final spurt the temperature rose to 300° F. and the reaction was completed. A dry solid product was thus obtained containing 73.4% sulfamic acid.

It will be observed that the proportions were 0.9 mols $H_2SO_4$ and 1.4 moles $SO_3$ for each mole of urea and that the pre-mix product was a wet heavy liquid which was easily transformed to sulfamic acid on heating.

While I have disclosed my invention with reference to a particular embodiment thereof, it is to be understood that variations may be made therein without departing from the spirit and scope of the invention as long as urea, sulfur trioxide and oleum are brought together in the proportions of substantially one mole of sulfuric acid and at least one mole of sulfur trioxide for each mole of urea while effecting cooling sufficient to inhibit the formation of sulfamic acid whereby a wet product is obtained and thereafter heating the wet product to convert it to sulfamic acid.

The proportions of the reagents are critical to this extent. They must be such that the final product of the process is obtained in a dry state. This means that the urea and the sulfuric acid should not be substantially in excess of one or the other and sulfur trioxide should be present in the proportion of at least one mole for each mole of sulfuric acid or urea. An excess of sulfur trioxide may be used since the excess will be vaporized in the conversion of the pre-mix to sulfamic acid. As a matter of fact, an excess of sulfur trioxide is desired to compensate for losses due to vaporization of sulfur trioxide and to combination with water during the process. Similarly a slight deficiency of sulfuric acid may be desirable in view of the sulfuric acid formed by reaction of water with sulfur trioxide. Other than this the proportions should be stoichiometric.

The temperatures necessary to suppress the sulfamic acid-forming reaction may be varied widely according to the particular conditions of the reaction. Thus, as in Example 1 where sulfamic acid is reacted with the urea in the first instance a temperature of as high as 158° F. failed to initiate the sulfamic acid-forming reaction whereas it is quite evident that such a high temperature is not at all practical in the process of Example 2. Those skilled in the art having in mind these principles will be able to select suitable temperatures and to provide sufficient agitation and cooling as may be required to maintain such temperatures uniformly throughout the reaction.

The conversion of the pre-mix to sulfamic acid may be effected in any suitable manner since all that is required is to bring the pre-mix to a suitable temperature at which the reaction will proceed at a practical velocity. This temperature too may vary according to the nature of the pre-mix but ordinarily a temperature ranging from about 180° F. to about 260° F. will be found suitable. Higher temperatures should be avoided since they are conducive to the formation of impurities such as ammonium bisulfate. In converting large masses it is usually desirable to provide some cooling to prevent the reaction mass from becoming too hot and this most suitably may be done by agitating the mass in contact with a temperature-controlled surface as in a graining bowl, a flaker, a Sigma-arm mixer or like apparatus or in a temperature-controlled atmosphere as in a rotary tube reactor or a space reactor and like apparatus.

I claim:

In the manufacture of sulfamic acid the steps of mixing urea and sulfamic acid to form a paste and introducing sulfuric acid and sulfur trioxide in the proportions of substantially one mole of sulfuric acid and at least one mole of sulfur trioxide for each mole of urea while effecting cooling throughout the mass adequate to inhibit formation of sulfamic acid and to give a wet reaction mass and thereafter heating the wet reaction mass to convert it to dry sulfamic acid.

HOWARD R. WILSON.

REFERENCES CITED

The following references are of record in the file of this patent:

UNITED STATES PATENTS

| Number | Name | Date |
|---|---|---|
| 2,191,754 | Cupery | Feb. 27, 1940 |
| 2,102,350 | Baumgarten | Dec. 14, 1937 |
| 2,109,952 | Wyler | Mar. 1, 1938 |
| 2,390,648 | Hill et al. | Dec. 11, 1945 |

FOREIGN PATENTS

| Number | Country | Date |
|---|---|---|
| 641,238 | German | Mar. 5, 1938 |